(12) United States Patent
Ferguson et al.

(10) Patent No.: US 7,590,583 B1
(45) Date of Patent: Sep. 15, 2009

(54) COMPUTER BASED METHOD OF PRICING EQUITY INDEXED ANNUITY PRODUCT WITH GUARANTEED LIFETIME INCOME BENEFITS

(75) Inventors: Derek Ferguson, Erin (CA); Richard Kado, Oakville (CA); Marc Verrier, Caledon (CA)

(73) Assignee: Genesis Financial Products, Inc., Mississauga, Ontario (CA)

( * ) Notice: Subject to any disclaimer, the term of this patent is extended or adjusted under 35 U.S.C. 154(b) by 372 days.

(21) Appl. No.: 11/453,692

(22) Filed: Jun. 15, 2006

Related U.S. Application Data

(60) Provisional application No. 60/790,194, filed on Apr. 7, 2006.

(51) Int. Cl.
*G06Q 40/00* (2006.01)
(52) U.S. Cl. ........................... 705/36 R; 705/37
(58) Field of Classification Search ............. 705/1, 705/36, 4, 30, 35, 37, 38, 39; 707/101, 102; 715/255, 805; 437/107
See application file for complete search history.

(56) References Cited

U.S. PATENT DOCUMENTS

| | | | | |
|---|---|---|---|---|
| 6,049,772 | A | * | 4/2000 | Payne et al. ............... 705/4 |
| 2003/0033228 | A1 | * | 2/2003 | Bosworth-Davies et al. .. 705/35 |

OTHER PUBLICATIONS

MFS Regatta Master Extra NY, Prospectus, May 1, 2003.*

Merkel, Steven,. "Getting the Whole Story on Variable Annuities." http://www.investopedia.com/printable.asp, Nov. 15, 2004.
Modeling Complex Derivatives Presentation, Genesis Financial Products, Inc., Ontario, Canada, Mar. 2, 2006.
MFS Regatta Masters Extra NY, Prospectus, May 1, 2003.
AssetAccess Brochure, The Guardian Insurance & Annuity Company, Inc., Apr. 2005.
Actuarial Guideline XXXV, Financial Condition Examiners Handbook, Dec. 1998, pp. 9-88 through 9-96.
Actuarial Guideline XXXIII, Part 9—Actuarial Guidelines, Financial Condition Examiners Handbook, Dec. 1998, pp. 9-71 thtough 9-76.

* cited by examiner

*Primary Examiner*—Mary Cheung
*Assistant Examiner*—John H Holly
(74) *Attorney, Agent, or Firm*—Simpson & Simpson, PLLC

(57) ABSTRACT

A computer-based method for determining a set of equity-indexed crediting parameters E for a lifetime-income equity-indexed deposit product provided to a set of owners having a set of dates of birth B, a rider charge C, a lifetime income percentage scale L, a set of profitability requirements R, a principal amount P, and an account value A. The method can include the steps of: establishing the values of C, L, R, P, A and E at a time when said deposit product is purchased; generating a set of yield curve and equity index scenarios consistent with valuation parameters; setting a trial value $E_i$ for E; calculating the observed distribution D of profitability; comparing D with R; and, computing a revised trial value $E_{i+1}$ for E, where the steps of establishing, generating, setting, calculating, comparing, and computing are performed by at least one general purpose computer.

34 Claims, No Drawings

COMPUTER BASED METHOD OF PRICING EQUITY INDEXED ANNUITY PRODUCT WITH GUARANTEED LIFETIME INCOME BENEFITS

CROSS-REFERENCE TO RELATED APPLICATIONS

This application claims the benefit, under 35 U.S.C. §119 (e), of U.S. Provisional Application No. 60/790,194 filed Apr. 7, 2006, which is hereby incorporated by reference.

REFERENCE TO COMPUTER PROGRAM LISTING/TABLE APPENDIX

The present application includes a computer program listing appendix on compact disc. Two duplicate compact discs are provided herewith. Each compact disc contains an ASCII text file of the computer program listing as follows:

| File Name | Size | Created |
| --- | --- | --- |
| lir.log.txt | 4600 KB | 06/08/2006 1:17:51 PM |
| lirval.log.txt | 51 KB | 06/08/2006 1:17:51 PM |
| lirval1.txt | 413 KB | 06/08/2006 1:17:51 PM |
| LMM1.DPR.txt | 38 KB | 06/08/2006 1:17:51 PM |
| Rmem4p.dpr.txt | 29 KB | 06/08/2006 1:17:52 PM |
| SIMPLX.CPP | 4 KB | 06/08/2006 1:17:52 PM |

The computer program listing appendix is hereby expressly incorporated by reference in the present application.

FIELD OF THE INVENTION

The present invention relates to a method and apparatus for performing pricing and reserving calculations for an equity-indexed annuity that provides guaranteed lifetime income benefits in addition to providing adjustability in payment timing, access to the principal, and income that can increase as the stock index increases.

BACKGROUND OF THE INVENTION

Since their introduction in the mid-1990's, equity-indexed annuities (EIAs) have become very popular with annuity buyers. These products combine security of principal with participation in equity index returns. They are therefore appealing to buyers who are risk-averse, but nonetheless want a chance to achieve the higher potential returns associated with equities. Recent sales statistics show EIAs making up 40% or more of life insurance general-account annuity sales, compared with almost none a decade ago.

In order to provide EIAs on a profitable basis, a life insurance carrier must have an appropriate investment strategy and hedging system in place. The potential for large losses if a carrier invests only in bonds, for example, but offers guaranteed returns based on stock-market performance is obvious. See, for example, U.S. Pat. No. 6,049,772 for a description of the hedging activity and software required to support the issuing of EIAs.

Since the sharp decline in U.S. stock prices in early 2000, retail investors have developed a much greater appreciation of the risks of direct equity investment. As a result, they have been increasingly willing to consider EIAs, because these are retirement savings vehicles that eliminate risks to principal while providing for equity-linked returns.

Similarly, as defined-benefit pension plan participation declines, retail investors are becoming increasingly aware of mortality risk: in this case, the risk that a retiree may outlive his or her retirement assets. A defined benefit pension plan provides retirees with income for life, and can reduce the associated mortality risk by means of "mortality pooling". When mortality is pooled, the greater benefits that may be paid to a longer-lived retiree can to a large degree be offset by lesser benefits paid to a more short-lived retiree.

The continuing decline in defined-benefit pension plan participation means that retirees, if they restrict themselves to conventional investments like stocks and bonds, are increasingly being forced to accept mortality risk. They must therefore plan for the "worst case" (living to an advanced age) and budget accordingly.

However, mortality pooling can also be provided by life insurance carriers. By making a guaranteed lifetime income available to annuity buyers on a pooled basis, the need for any one buyer to invest for the "worst case" is eliminated, and so a higher level of income can be guaranteed for a given starting principal amount. Any one buyer's principal need only provide for the "average case", not the "worst case".

The guaranteed lifetime income benefit being described should not be confused with annuitization, i.e. the purchase of a single-premium immediate annuity (SPIA). SPIA's are described in, e.g., Life Insurance (10th edition) by S.S. Heubner & Kenneth Black.

Although both the EIA guaranteed lifetime income benefit and SPIAs rely on mortality pooling, there are a number of critical differences. An SPIA provides lifetime income, but does so on a basis that is extremely inflexible. For example, SPIAs typically allow little opportunity for the owner to access principal after income has started (although commutation of a certain portion of payments may sometimes be negotiated with a carrier). This is in fact one of the most commonly-voiced objections to the purchase of an SPIA: annuity buyers do not want to irrevocably surrender control of their principal to a life insurance company. Additionally, the vast majority of SPIAs do not provide for an income that can increase over time depending on stock index performance: instead, the income amount is fixed at issue and cannot vary thereafter. Furthermore, SPIAs do not allow for flexibility in the timing of payments over the course of a year. Typically, the same amount is paid out each month, regardless of the cashflow requirements of the owner.

Life insurance carriers have recently started to add guaranteed lifetime income benefits to variable annuities (VA), but once again these are distinct from the benefit described here. It is more difficult for a life insurance carrier to offer profitably with a VA, because they have much more basis risk, i.e., the risk that the financial instruments available for hedging will fail to match the behavior of the liability.

For example, many of the mutual funds offered in a typical VA are actively managed. This means that their performance will generally not match the performance of readily-available hedging instruments such as S&P 500 futures, for at least three reasons: 1) The asset mix held by the mutual fund manager will have the same investment return as a quoted index only by coincidence; 2) The mutual fund will have higher trading costs and expenses than would be typical of investment in, e.g., an unmanaged index through an exchange-traded fund; and 3) The fund manager may vary the allocation of assets between equities and fixed income in an attempt to outperform the market. Any such trading strategy will create additional optionality in the fund's values and make it harder for the life insurance carrier to hedge. Additionally, the owner of the variable annuity may transfer money from one fund to another or to a fixed interest account at unpredictable intervals, magnifying the basis risk problem.

Calculation of VA statutory reserves can be more complex and computation-intensive, at least given current regulatory requirements. VA reserves require calculation of a conditional tail expectation (CTE) of the greatest accumulated loss over a large number of scenarios and therefore require detailed Monte Carlo simulation of both assets and liabilities.

The VA lifetime income benefit also has disadvantages from the point of view of the buyer. A lifetime income benefit attached to a VA will typically not provide any accumulation guarantees in addition to the income benefit, so it may be harder to meet emergency cashflow or critical illness expenses using such a product.

Thus, there is a long felt need for a method and apparatus for performing pricing and reserving calculations for an equity-indexed annuity that does not restrict access to the principal, which allows income to increase with increases in the stock index, and which does not have rigid payment windows.

SUMMARY

The invention broadly comprises a computer-based method for determining a set of equity-indexed crediting parameters E for a lifetime-income equity-indexed deposit product provided to a set of owners having a set of dates of birth B, a rider charge C, a lifetime income percentage scale L, a set of profitability requirements R, a principal amount P, and an account value A. The method can comprise the steps of: establishing the values of C, L, R, P, A and E at a time when the deposit product is purchased; generating a set of yield curve and equity index scenarios consistent with valuation parameters; setting a trial value $E_i$ for E for the product; calculating the observed distribution D of profitability using the scenarios established; comparing D with R; and, computing a revised trial value $E_{i+1}$ for E for the product. The steps of establishing, generating, setting, calculating, comparing, and computing are performed by at least one general purpose computer specially programmed to perform the steps of establishing, generating, setting, calculating, comparing, and computing.

In some aspects, the method includes the step of calculating the lifetime income percentage scale L depending on an elapsed time between the latest date from the set B and a time when income commences. The method can also include equity-index linked increases dependent on the elapsed time between the latest date in the set B and the date of each increase. The method can also include point-to-point equity index credits specified by the set of equity-indexed crediting parameters E, where the credits are calculated using a percentage of an increase in an equity index, credited at the end of each policy year. The credit can be no less than an annual minimum value and optionally no greater than an annual maximum value.

In some aspects, the method includes point-to-average equity index credits specified by the set of equity-indexed crediting parameters E, where the index credits are calculated using a percentage of an increase in an equity index from a year-start value to an average of values over the policy year, and the credit is credited at the end of each policy year. The credit can be no less than an annual minimum value and optionally no greater than an annual maximum value.

In some aspects, the method includes point-to-point equity index credits specified by the set of equity-indexed crediting parameters E, where the credits are calculated using a percentage of an increase in an equity index, and the credit is credited at the end of an index interval equal to an integral number N of policy years. The credit can be no less than a minimum value and optionally no greater than a maximum value calculated during each index interval.

In some aspects, the computer-based method includes point-to-average equity index credits specified by the set of equity-indexed crediting parameters E, where the credits are calculated using a percentage of an increase in an equity index from a starting value to an average of values over an index interval equal to an integral number N of policy years, and the credit is credited at the end of the index interval. The credit can be no less than a minimum value and optionally no greater than a maximum value calculated during each index interval.

In some aspects, the computer-based method includes point-to-point equity index credits specified by the set of equity-indexed crediting parameters E, where the credits are calculated using a weighted sum that adds a compounded value calculated using a declared rate to a percentage of change in an equity index, and the credit is credited at the end of an index interval equal to an integral number N of policy years. The credit can be no less than a minimum value and optionally no greater than a maximum value during each index interval.

In some aspects, the computer-based method includes point-to-average equity index credits specified by the set of equity-indexed crediting parameters E, where the credits are calculated using a weighted sum that adds a compounded value calculated using a declared rate to a percentage of change in an equity index from a starting value to an average of values over an index interval equal to an integral number N of policy years, and the credit is credited at the end of the index interval. The credit can be no less than a minimum value and optionally no greater than a maximum value during each index interval.

The invention also further broadly comprises a computer-based method for determining a set of equity-indexed crediting parameters E for a lifetime-income equity-indexed deposit product provided to an owner having a date of birth B, a rider charge C, a lifetime income percentage scale L, a set of profitability requirements R, a principal amount P, and an account value A. The method can include the steps of: establishing the values of C, L, R, P, A and E at a time when the deposit product is purchased; generating a set of yield curve and equity index scenarios consistent with valuation parameters; setting a trial value $E_i$ for E for the product; calculating the observed distribution D of profitability using the index scenarios; comparing D with R; computing a revised trial value $E_{i+1}$ for E for the product; and, calculating the lifetime percentage scale L depending on the elapsed time between the date of birth B and a time when income commences. The steps of establishing, generating, setting, calculating, comparing, computing, and depending are performed by at least one general purpose computer specially programmed to perform the steps of establishing, generating, setting, calculating, comparing, computing, and depending. The method can also include equity-index linked increases depending on the elapsed time between date of birth B and a date when each increase occurs.

The invention also broadly comprises a computer-based apparatus for determining the value of a lifetime equity-indexed deposit product which includes a set of equity-indexed crediting parameters E for the lifetime income equity-indexed deposit product provided to a set of owners having a set of dates of birth B, a rider charge C, a lifetime income percentage scale L, a set of profitability requirements R, a principal amount P, and an account value A, with C, R, L, P, A, and E determined at a time when the deposit product is purchased. The seller is permitted to choose E and compute an observed distribution D of profitability of the deposit product such that D satisfies a set of profitability requirements R.

In some aspects, the invention can include calculating the lifetime income percentage scale L depending on the elapsed time between a latest date in the set B and a time when income commences or the date of each increase in income. The computer-based apparatus can also include point-to-point equity index credits specified by the set of equity-indexed crediting parameters E, where the credits are calculated using a percentage of an increase in an equity index, and the credits can be credited at the end of each policy year. The credit can be no less than an annual minimum value and optionally no greater than a maximum value.

In some aspects, the apparatus includes point-to-average equity index credits specified by the set of equity-indexed crediting parameters E, where the credits are calculated using a percentage of an increase in an equity index from a year-start value to an average of values over the policy year, and the credits are credited at the end of each policy year. The credits can be no less than an annual minimum value and optionally no greater than a maximum value.

In some aspects, the apparatus includes point-to-point equity index credits specified by the set of equity-indexed crediting parameters E, where the credits are calculated using a percentage of an increase in an equity index, and the credits are credited at the end of an index interval equal to an integral number N of policy years. The credit can be no less than a minimum value and optionally no greater than a maximum value calculated during each index interval.

In some aspects, the apparatus includes point-to-average equity index credits specified by the set of equity-indexed crediting parameters E, where the credits are calculated using a percentage of an increase in an equity index from a starting value to an average of values over an index interval equal to an integral number N of policy years, and the credits are credited at the end of the index interval. The credit can be no less than a minimum value and optionally no greater than a maximum value calculated during each index interval.

In some aspects, the apparatus includes point-to-point equity index credits specified by the set of equity-indexed crediting parameters E, where the credits are calculated using a weighted sum that adds a compounded value calculated using a declared rate to a percentage of change in an equity index, and the credit is credited at the end of an index interval equal to an integral number N of policy years. The credit can be no less than a minimum value and optionally no greater than a maximum value during each index interval.

In some aspects, the apparatus includes point-to-average equity index credits specified by the set of equity-indexed crediting parameters E, where the credits are calculated using a weighted sum that adds a compounded value calculated using a declared rate to a percentage of change in an equity index from a starting value to an average of values over an index interval equal to an integral number N of policy years, and the credit is credited at the end of the index interval. The credit can be no less than a minimum value and optionally no greater than a maximum value during each index interval.

In some aspects, the invention further comprises a computer-based apparatus for determining the value of a lifetime equity-indexed deposit product which includes a set of equity-indexed crediting parameters E for the lifetime income equity-indexed deposit product provided to an owner having a date of birth B, a rider charge C, a lifetime income percentage scale L, a set of profitability requirements R, a principal amount P, and an account value A. The values of C, R, L, P, A, and E can be determined at a time when the deposit product is purchased, and a seller is permitted to choose E and compute an observed distribution D of profitability of the product such that D satisfies a set of profitability requirements R. The lifetime income percentage L can depend on the elapsed time between at least one date of birth B and a time when income commences. The apparatus can also include equity-index linked increases depending on the elapsed time between date of birth B and a date when each increase occurs.

It is an object of the present invention to provide a computer based method and apparatus for performing pricing and reserving calculations for an equity-indexed annuity that enables access to the principal of the annuity.

It is a another object of the present invention to provide a computer based method and apparatus for calculating an equity indexed annuity that can provide income that can increase over time depending on stock performance.

It is a further object of the present invention to provide a computer based method and apparatus for performing pricing and reserving calculations for an equity indexed annuity that can provide flexibility in the timing of income disbursements.

These and other objects and advantages of the present invention will be readily appreciable from the following description of preferred embodiments of the invention and from the accompanying claims.

DETAILED DESCRIPTION OF THE INVENTION

While the present invention is described with respect to what is presently considered to be the preferred embodiments, it is understood that the invention is not limited to the disclosed embodiments.

U.S. Provisional Application No. 60/790,194, filed Apr. 7, 2006, is hereby incorporated by reference in its entirety. This reference is incorporated herein by reference for the purpose of describing and disclosing, for example, materials, systems, and methodologies that are described in the references, which might be used in connection with the presently described invention. The references discussed above and throughout the text are provided solely for their disclosure prior to the filing date of the present application. Nothing herein is to be construed as an admission that the inventors are not entitled to antedate such disclosure by virtue of prior invention.

The computer based method for performing pricing and reserving calculations for an equity indexed annuity with guaranteed lifetime income benefit described herein addresses the problems found in currently available retirement products in a way that provides annuity buyers with additional flexibility. For example, the product does not require the buyer to irrevocably surrender control over their principal; income can increase over time depending on stock index performance; and the owner has flexibility in the precise timing of income in each year.

Other problems associated with variable annuities (VA's), such as higher trading costs and expenses, variation in the allocation of assets increase difficulty in hedging, and higher basis risk, are not problems typical of equity-indexed annuities (EIA's). Since performance of EIA's is generally linked to an index that can be hedged using stock index futures, and reallocation between different indexing alternatives during an indexing term is typically not permitted. This vastly simplifies investment management for the product.

In contrast, EIA's, even with the lifetime guaranteed income benefit, can be valued using the Commissioners Annuity Reserve Valuation Method (CARVM) augmented with option valuation techniques in accordance with Actuarial Guidelines 33 and 35. In many cases, dependent on the guarantee and surrender charge structure of the product, it may be possible to establish that the statutory reserve is equal to the product's cash value, which will already be carried on the insurer's administrative system since it is needed for day-to-day administration.

Thus the EIA lifetime income benefit can be offered more easily on a profitable basis, and has a number of operational advantages to the life insurance carrier as well as being attractive from the point of view of the buyer.

Accordingly, there is a growing consumer need for an EIA that can provide guaranteed lifetime income in addition to the well-known accumulation benefits and guarantees that EIAs typically provide. As a direct consequence, there is also a growing need among life insurance carriers for a computer-based system that can determine reserves for such an EIA and price it so that it can be provided on a profitable basis.

A Lifetime Income Rider (LIR) guarantees a minimum annual income for the owner during his or her lifetime. It does this by guaranteeing an annual withdrawal amount that can be taken by the owner even if the Annuity Value has been exhausted. The income amount is equal to a percentage of the highest Annuity Value on any anniversary once income has commenced. Although different designs can be constructed and priced using the software by one skilled in the art, the following illustrative values provide an example.

The earliest that income can commence is the owner's attained age 60. The income percentage if income begins before age 70 is 5%. For income starting at attained ages 70-79 it is 6%, and for income starting at attained ages of 80 and up it is 7%. The income amount is guaranteed never to decrease as long as the amount withdrawn per policy year does not exceed it, even if the Annuity Value falls to zero. The income amount is reduced in any year that the total withdrawal is greater than the income amount—the amount by which the withdrawal exceeds the income amount is called the overrun. The new income amount is then equal to: (a) the old income amount; multiplied by (b) the Annuity Value after the overrun; and divided by (c) the Annuity Value before the overrun.

The income amount will increase if the Annuity Value is ever higher than its level at the time of the first income payment. The annual premium for the LIR is currently 0.40% of the Annuity Value and is guaranteed not to exceed 0.75% for new issues. This rider guarantees that a client can receive an amount in each Policy Year up to the Income Amount, as defined below, for that Policy Year, until the death of the Owner, regardless of the Annuity Value. If a client never takes a withdrawal greater than the Income Amount in any Policy Year, the Income Amount is guaranteed never to decrease.

The Income Date is the date that income payments under this rider will begin. The Income Date must be on or after the owner's 60th birthday (or if the Owner is not a natural person, the Annuitant's 60th birthday). If the Income Date is not the Issue Date, the carrier must receive the owner's written request to establish the Income Date.

For each Policy Year, the Income Amount for that year is equal to the Adjusted Annuity Value at the start of that Policy Year times the Lifetime Income Percentage, as shown on the data page. The Lifetime Income Percentage depends on the age of the Youngest Owner (or the age of the youngest Annuitant if the Owner is not a natural person) at the Income Date.

This Rider guarantees that in each Policy Year after the Income Date, the client is entitled to receive an amount up to the Income Amount for that year. The client is entitled to request to receive this amount in one to twelve payments even if the Annuity Value is zero. In any Policy Year, the client may choose to withdraw less than the Income Amount for that Year.

Provided the Annuity Value is greater than zero, these payments will be deducted from the Annuity Value but no Surrender Charges will apply to these payments. The free withdrawal amount under the Policy will be reduced by the Income Amount. As with other Withdrawals, the carrier will deduct the amount of the payment from the Annuity, and such payments will reduce the Annuity Value, the Surrender Value, and the Death Benefit. In each Policy Year, if the client withdraws an amount greater than the Income Amount it will be termed an Overrun. An Overrun will generally reduce the Income Amount in future years.

On the Income Date, the Adjusted Annuity Value is equal to the Annuity Value. After that date, the Adjusted Annuity Value is modified as follows:

1. Each time an Overrun occurs, the Adjusted Annuity Value immediately prior to the Overrun is multiplied by an amount equal to (a) divided by (b) where, (a)=The Annuity Value prior to the Overrun minus the Overrun (b)=The Annuity Value prior to the Overrun.

2. On each Policy Anniversary, the Adjusted Annuity Value is set equal to the higher of its value at that time, or the Annuity Value on that date after all interest is credited and rider premiums are deducted.

Once declared, the Rider Annual Premium Rate cannot be changed. While the rider is in force, the rider premium will be deducted from the Annuity Value annually.

This rider terminates on the earliest of the following dates: Upon receipt of the owner's written request to terminate this rider; When the Policy terminates; When the client elects to start payments under a settlement option; When an Owner, who is a Natural Person, assigns the ownership of the Policy; Upon death of the Owner or any Joint Owner; or When the Owner is not a Natural Person, and the Annuitant dies or a new Annuitant is named.

Once the rider has been terminated, it may not be re-elected or reinstated. There will be no further premium due for this rider. However, the carrier will continue to deduct any outstanding rider premiums until the earlier of the date that the Policy terminates, or when settlement option payments start.

As long as this rider is in force, even if the Annuity Value is zero, The client will continue to receive an amount up to the Income Amount each Policy Year that the Owner (the youngest Owner on the Date of Issue if joint owners) is alive. If any income payments are made while the Annuity Value is zero, other benefits under the Policy will be terminated, including the Death Benefit, the right to a distribution under a settlement option, and the right to withdraw an amount larger than the Income Amount.

The carrier must be notified of the death of the Owner on a timely basis. If the carrier makes one or more payments under this rider after the death of the Owner, then the recipient must refund those payments plus interest at an annual rate of 6% or, if less, the maximum rate allowed by the state in which this Policy was sold.

At the Annuity Date, any income payments under this rider shall be provided as a settlement option. If the client selects this settlement option, then the Annuitant must be named as the Owner, and income payments will continue until the Death of the Owner. All other benefits under the Policy will terminate.

Programs are implemented in APL2000's APL*PLUS Windows Version 3.6, Borland's Delphi 4.0, and Borland C++. The APL language uses a special character set which includes a number of non-ASCII characters. We use Jim Weigang's well-known reversible transliteration scheme to display APL source code using only ASCII characters.

Because the transliteration scheme is reversible, standard utilities can be used to reconstruct the APL source for execution by the APL interpreter. A preferred embodiment of the invention generates code in both a high-level interpreted language (for ease of verification) and equivalent code in a compiled language (for faster execution). Many different target languages could play these roles. In this implementation we use APL as the interpreted language and Delphi (Borland Software's implementation of Object Pascal) as the compiled language, but many other language pairs (e.g. [Smalltalk, C++], or [Lisp, Fortran90]) are also possible. The assumed operating system is Microsoft Windows (e.g. Windows 98 SE, Windows XP, or a similar operating system).

The pricing program calculates profitability for a model office (with assumed issue ages of 45, 55, 65, 73, 78, and 83) under a number of different utilization assumptions ("tracks") for the lifetime income benefit. The lifetime income benefit is provided by the lifetime income rider described above, and the tracks modeled are as follows: Track 1—The EIA buyer does not add the lifetime income rider to the base EIA policy, and so no rider premiums are charged and no lifetime income benefits are provided. Track 2—The EIA buyer adds the lifetime income rider at issue and pays the rider charge from issue, but never actually starts taking the lifetime income benefit. This is primarily a sensitivity test to determine what product profitability would be under such an assumption. One way that it could come about would be as a result of a change in the buyer's financial resources or financial plan. For example, another financial asset held by the buyer could perform very well and generate enough income so that it does not become necessary to "dip into" the annuity value. Track 3—The lifetime income rider is added at issue and the buyer starts taking lifetime income as soon as it is available—at age 60 for the younger issue ages (45 and 55) and immediately for the older issue ages (65, 73, 78, and 83). Track 4—The lifetime income rider is added at issue and the buyer starts taking lifetime income five years after it is available—at age 65 for the younger issue ages (45 and 55) and five years after issue for the older issue ages (65, 73, 78, and 83).

The number of scenarios to be run for each issue age and utilization assumption is currently set at 100. This parameter, along with many others, can be modified by editing the character matrix delphi_rc_qual1_7. The different parameters contained in this matrix, along with descriptions of the parameters, are included in the workspace listing lir1.txt.

Other key assumptions are the rider premium rate (in this example, 0.40% of the annuity account value per year) and the lifetime income amount as a percentage of the annuity value (5% for attained ages at income commencement of 60-69, 6% for attained ages at income commencement of 70-79, and 7% for attained ages at income commencement of 80 and up).

To determine expected profitability for the model office of equity-indexed annuities including the lifetime income benefit, perform the following steps: Compile the dynamic link libraries (DLL's) in the directory where the APL interpreter (aplw.exe) resides. The source for Imm1.dll and rmem4p.dll is written in Delphi and the source for simplex03.dll is written in C++; Start the APL2000 interpreter aplw.exe, and set working memory to approximately 256 Megabytes using the APL command ) CLEAR 256000000; Load the pricing workspace LIR3; and, Type the name of the top-level function "main" and hit enter. The program will run for approximately 6-8 hours on a 2.5 GHz Pentium computer, and is complete when the word "done" appears in the APL session log.

The program has a number of different reporting options for profit distribution. The simplest is to examine the after-tax premium margin (ATPM) that is contained in the APL variable keepatpm.

Thus, the average statutory after-tax profit margin for each issue age within each track can be displayed by typing in the following APL expression and hitting enter:

(6/1 2 3 4),(24{rho}45 55 65 73 78 83)[1.5]
    0.01{times}+/24 100{rho} keepatpm, giving the following example result:

1 45 1.941671

1 55 1.862895

1 65 1.68771

1 73 1.310585

1 78 1.551572

1 83 1.597096

2 45 3.100838

2 55 3.013799

2 65 2.802138

2 73 2.367942

2 78 2.54258

2 83 2.489268

3 45 4.42695

3 55 3.715289

3 65 2.741677

3 73 1.855807

3 78 2.123491

3 83 1.933613

4 45 4.504639

4 55 4.167842

4 65 3.582732

4 73 2.854987

4 78 2.823635

4 83 2.745147

Similarly, a vector of statutory profits for each issue age/rider track is stored in a variable called keepbookprofits once the program has finished running, and it can be displayed to show the year-by-year and scenario-by-scenario variations in profit results.

The program uses an approximation to the full-fledged CARVM-UMV statutory reserve computation to achieve acceptable computational speed. This approximation has been validated by comparison with the results of the APL valuation workspace LIRVAL1.

Valuation Methodology for EIAs with Lifetime Income Benefit

The policy is an equity-indexed single-premium deferred annuity with annual credits based on a rate declared by the Company or on increases in the S&P 500 Index. Three crediting methods are currently available: The Declared Rate Crediting Method, under which credits to the policy are based on an interest rate declared annually by the Company; The S&P 500 Index One-Year Crediting Method, under which credits to the policy are based on annual point-to-point changes in the index, modified by a Participation Rate (or percentage of participation), Cap (or maximum value), and Floor (or minimum value) declared annually by the Company; and the S&P 500 Index One-Year Averaged Crediting Method, under which credits to the policy are based on annual point-to-monthly-average changes in the index, modified by a Participation Rate, which is a percentage that the client participates, Cap, and Floor declared annually by the Company.

The policy provides that a Premium Enhancement Amount, equal to a specified percentage of premium, may be added by the Company to the Annuity Value at the time of issue. The Premium Enhancement Amount will be zero percent of the premium at launch, although it may be positive for future new issues.

The policy includes a confinement and disability waiver of surrender charges (Surrender Charge Waiver or SCW) provision that waives surrender charges if the owner becomes disabled or is confined to a nursing home. This benefit is part of the base policy form rather than being made available by rider or endorsement.

Three riders and endorsements providing additional benefits are also available: ROP—Return of Premium, which guarantees that the surrender value will not be less than the net premium for the annuity, adjusted for withdrawals; LIR—The Lifetime Income Rider, which provides for annual lifetime income equal to a percentage of the highest Annuity Value on any policy anniversary on or after the start of the income; and EEB—The Enhanced Earnings Benefit, which provides an additional death benefit equal to a percentage of the growth in the Annuity Value, adjusted for withdrawals.

The Lifetime Income Rider guarantees a minimum annual income for the owner during his or her lifetime. It does this by guaranteeing an annual withdrawal amount that can be taken by the owner even if the Annuity Value has been exhausted.

The income amount is equal to a percentage of the highest Annuity Value on any anniversary once income has commenced. The earliest that income can commence is the owner's attained age 60. The income percentage if income begins before age 70 is 5%. For income starting at attained ages 70-79 it is 6%, and for income starting at attained ages of 80 and up it is 7%.

The income amount is guaranteed never to decrease as long as the amount withdrawn per policy year does not exceed it, even if the Annuity Value falls to zero. The income amount is reduced in any year that the total withdrawal is greater than the income amount. The new income amount is then equal to: (a) the old income amount; multiplied by (b) the Annuity Value after the excess withdrawal; and divided by (c) the Annuity Value before the excess withdrawal.

The income amount will increase if the Annuity Value is ever higher than its level at the time of the first income payment. The annual premium for the LIR is currently 0.40% of the Annuity Value and is guaranteed not to exceed 0.75% for new issues. The Earnings Enhancement Benefit (EEB) provides an additional benefit on death equal to a percentage of the growth in the Annuity Value, i.e., its excess over the single premium.

The percentage is equal to 45% for issue ages under 70, 25% for issue ages 70-74, 20% for issue ages 75-79, and 15% for issue ages 80 to 85. The annual rider premium is currently 0.25% of the Annuity Value per year and is guaranteed not to exceed 0.40% for new issues. The growth in the Annuity Value is defined as the Annuity Value less the adjusted premium.

At issue, the adjusted premium is equal to the premium. After any withdrawal, the adjusted premium is equal to the adjusted premium on the previous day multiplied by the Annuity Value after the withdrawal and divided by the Annuity Value before the withdrawal.

Policy values for this policy form are the Annuity Value, the Minimum Guaranteed Surrender Value, and the Surrender Value. The Annuity Value is the sum of the Crediting Method Account Values. If the policy is in force at the Maturity Date then the greater of the Annuity Value and the Minimum Guaranteed Surrender Value will be applied to purchase an immediate annuity. A Premium Enhancement Amount, equal to a specified percentage of premium, may be added by the Company to the Annuity Value at the time of issue. The Premium Enhancement Amount will be zero percent of the premium at launch, although it may be positive for future new issues. If positive, the Premium Enhancement Amount is allocated pro-rata to each Crediting Method Account Value after the cancellation period and is eligible for surrender (subject to surrender charges), and also for interest credits.

At launch, the available crediting methods for the policy will be the Declared Rate Crediting Method, the S&P 500 Index One-Year Crediting Method, and the S&P 500 Index One-Year Averaged Crediting Method.

The Declared Rate Crediting Method Account Value earns declared interest on a daily basis. A new interest rate is declared at the beginning of each policy year. Transfers can be made into or out of the Declared Rate Crediting Method at each policy anniversary. The Declared Rate Crediting Method Account Value is equal to the following: a) the net premium (single premium minus premium taxes) allocated to that account value, plus the pro-rata share of any Premium Enhancement Amount; plus b) Fixed daily interest; plus c) Transfers into the account value on any policy anniversary; minus d) Transfers out of the account value on any policy anniversary; minus e) Any rider premiums deducted from the account; minus f) Any amounts surrendered from the account (including any applicable surrender charges).

At launch, the available equity-indexed crediting methods will be the S&P 500 Index One-Year Crediting Method and the S&P 500 Index One-Year Averaged Crediting Method. After launch, new equity-indexed crediting methods may be added to the policy form by endorsement.

Indexed interest is credited at the end of each policy year. The amount to be credited equals the Account Value times the growth in the S&P 500 Index over the policy year, but no less than the Account Value times the Floor, and no greater than the Account Value times the Cap. The Floor is currently 0% for both equity-indexed crediting methods.

For the S&P 500 Index One-Year Crediting Method, growth is measured by comparing the starting value of the index with its ending value; for the S&P 500 Index One-Year Averaged Crediting Method, growth is measured by comparing the average of its ending values on each policy month during the policy year with the starting value of the index.

Each Equity-Indexed Crediting Method Account Value is equal to the following: a) The net premium (single premium minus premium taxes) allocated to that account value, plus the pro-rata share of any Premium Enhancement Amount; plus b) Indexed interest on each policy anniversary; plus c) Transfers into the account value on any policy anniversary; minus d) Transfers out of the account value on any policy anniversary; minus e) Any rider premiums deducted from the account; minus f) Any amounts surrendered from the account (including any applicable surrender charges).

The Surrender Value of the policy is the greater of: the Annuity Value, less any surrender charge, and the Minimum Guaranteed Surrender Value.

The surrender charge schedule for the 7-year version of the policy form will be as follows:

| Years completed | Surrender Charge as % of Annuity Value |
|---|---|
| 0 | 7% |
| 1 | 7% |
| 2 | 6% |
| 3 | 5% |
| 4 | 4% |
| 5 | 3% |
| 6 | 2% |
| 7 | 0% |

The surrender charge schedule for the 10-year version of the policy form will be as follows:

| Years completed | Surrender Charge as % of Annuity Value |
|---|---|
| 0 | 9% |
| 1 | 9% |
| 2 | 8% |
| 3 | 7% |
| 4 | 6% |
| 5 | 5% |
| 6 | 4% |
| 7 | 3% |
| 8 | 2% |
| 9 | 1% |
| 10+ | 0% |

The surrender charge is waived on the first 10% of the Annuity Value as of the beginning of each year in each policy year after the first.

Minimum Guaranteed Surrender Value—The Minimum Guaranteed Surrender Value for the policy equals: a) the single premium paid by the owner (adjusted for premium taxes) multiplied by the Net Consideration Percentage; plus b) any Excess Interest Credits; less c) any amounts surrendered (not including any applicable surrender charge); less d) any rider charges, e) all accumulated at the minimum guaranteed interest rate. The Net Consideration Percentage will be 90%.

The minimum guaranteed interest rate will be set at issue. It will at least be equal to: the monthly average five-year Constant Maturity Treasury Rate as published by the Board of Governors of the Federal Reserve Board for the second full calendar month preceding the issue date, rounded to the nearest 0.05%, and reduced by 1.25%. For minimum guaranteed cash values linked to equity indexed crediting method account values, the minimum guaranteed interest rate will be reduced by a further R % to reflect equity participation (where R is between 0% and 1%) provided, however, that such resulting rate will be no greater than 3% nor less than 1%.

Indexed Interest Example—Assume the client takes no withdrawals prior to the end of the policy year.

Assume the following:
The single premium is $10,000.
The Premium Enhancement Amount is $0.
The entire premium is allocated to the S&P 500 Index One-Year Crediting Method.
No withdrawals are taken during the first policy year.
The Participation Rate is 100%.
The Cap Rate is 6.5%.
The Floor Rate is 0%.
The S&P 500 Index is 1,000 at issue.
The S&P 500 Index is 1,100 at the first policy anniversary.
Then the Equity Index Percentage Change is (1,100−1,000)/1,000, or 10%. Since this is greater than the cap of 6.5%, the interest credit is equal to $10,000×6.5%, which equals $650. This amount is added to the Account Value, which is then $10,650.

The Death Benefit payable upon receipt of due Proof of Death will be the greater of the Minimum Guaranteed Surrender Value and the Annuity Value. Indexed interest is credited on any equity-indexed crediting methods by treating the date of death as the end of the equity-indexing year.

Valuation of the annuity during the deferral phase is in accordance with the Commissioners Annuity Reserve Valuation Method (CARVM) under the Standard Valuation Law (SVL), as interpreted and clarified by Actuarial Guideline 33 (Determining CARVM Reserves for Annuity Contracts with Elective Benefits) and Actuarial Guideline 35 (The Application of the Commissioners Annuity Reserve Method to Equity Indexed Annuities).

The company will value the annuity on an issue-year basis. The computational method used will be the Commissioners Annuity Reserve Method with Updated Market Values (CARVM-UMV). The plan, together with its riders, is a Type C annuity as defined in the SVL. There is no market-value adjustment (MVA) to withdrawn values, i.e. funds can be withdrawn in installments over less than five years without adjustment to reflect changes in interest rates or asset values since receipt of the funds by the insurance company. No guarantee is extended for credited interest rates on annuity considerations received more than one year from the date of issue, since the plan is a single-premium contract.

In order to apply Actuarial Guideline 33, each of the benefits offered by the policy must be classified as elective or non-elective for purposes of development of integrated benefit streams. Briefly, the benefits can be classified as: Elective: The elective benefits offered by the policy are surrender, annuitization, and the LIR benefit. Non-elective: The non-elective benefits offered by the policy are the policy death benefit, the EEB, and the Surrender Charge Waiver. Since they are non-elective it is appropriate to use incidence rates for these benefits in the development of integrated benefit streams. As described in Parts 3 & 4 of the text of Actuarial Guideline 33, valuation interest rates are determined using contract-level and benefit-level parameters, and generally will vary depending on whether benefits are elective or non-elective.

Surrender and withdrawal benefits provided by the plan and its riders are elective benefits and are valued using the Type C valuation interest rate. The Declared Rate, Participation Rate, Floor, and Cap for the annuity are declared annually, and so a guaranteed duration of one year is used.

Death benefits under the plan and its riders, being non-elective benefits, are discounted using the Type A valuation rate with a guarantee duration of one year as prescribed by Section 4(C) of the text of Actuarial Guideline 33. Similarly, the benefit provided by the Surrender Charge Waiver is also a non-elective benefit and it is also valued using the Type A valuation interest rate with a guarantee duration of one year.

Annuitization benefits are available for life (optionally with a guarantee period of ten or twenty years) or as installments over five years or more. They are valued using the Type A valuation rate with a guarantee duration equal to the number of years after issue that annuitization is assumed to occur, as prescribed in Section 4(B) of the text of Actuarial Guideline 33.

Actuarial Guideline 35 prescribes four computational methods for equity-indexed annuities that may be considered to be acceptable interpretations of CARVM. These are the Enhanced Discounted Intrinsic Method (EDIM), the Commissioners Annuity Reserve Valuation Method with Updated Market Values method (CARVM-UMV), the Market Value Reserve Method (MVRM), and the Black-Scholes Projection Method (BSPM), a variant of the MVRM.

According to Actuarial Guideline 35, *General Requirements on the Use of Certain Computational Methods*, the policy form design must feature a single dominant benefit in order for the EDIM, MVRM, and BSPM computational methods to be considered to be acceptable interpretations of CARVM. The single dominant benefit is the most likely benefit to be provided under the policy form according to criteria defined in the Guideline.

The benefits provided by the Enhanced Earnings Benefit Rider (EEB) and Lifetime Income Rider (LIR) are not concentrated at a single duration. The benefits provided by the LIR depend on the date at which income commences: this date is selected by the owner after issue and is not known to the Company in advance.

Additionally, a policy may be issued with both EEB and LIR. In this case the relative magnitudes of the benefits under EEB (which becomes more valuable if mortality increases) and LIR (which becomes more valuable if mortality decreases) are not known at issue. Therefore, depending on the riders that have been chosen, it may be the case that this form does not meet the Guideline's requirements for the use of EDIM, MVRM, and BSPM. Accordingly, the valuation will be performed using the CARVM-UMV computational method, as being uniformly applicable to all cases.

As outlined in Actuarial Guideline 35's *Description of Computational Methods* (Attachment I to the Guideline), in order to perform a CARVM-UMV valuation, policy benefits must be resolved into two components: the guaranteed floor benefits at each duration; and any benefit that can arise at each duration in excess of the guaranteed floor benefits. Any such excess is defined as an equity-indexed benefit, and the market value of an index option having this benefit as payoff is then used in the CARVM-UMV calculation.

The Guideline requires that these option market values be accumulated at the valuation interest rate to the option expiry date and added to the guaranteed floor benefits. The option market values for the different benefit streams will in general be accumulated at different rates, because Actuarial Guideline 33 requires the application of different valuation interest rates for elective and non-elective benefits, and different valuation interest rates for surrenders and annuitizations.

Guaranteed minimum floor benefits and option values are therefore developed for each of the following benefit streams: Death benefits (including benefits under the EEB rider, if this rider has been added); Annuitization benefits; Surrender charge waiver benefits; Surrender and partial withdrawal benefits; and, LIR (guaranteed lifetime income) benefits.

Once these guaranteed minimum floor benefits and option values have been computed, the option market values can be accumulated at the applicable valuation interest rates to the option expiry dates and added to the guaranteed floor benefits. A CARVM valuation of the resulting total benefit streams is then performed.

The determination of guaranteed floor benefits for the policy is straightforward if no riders are attached. Minimum policy values (and hence guaranteed floor benefits) can be calculated by assuming that 100% of premium is allocated to the equity-indexed crediting methods and that there is no growth in the S&P 500 Index, i.e., by assuming a scenario in which the year-on-year growth in the index is zero or negative.

In this no-growth case, the Annuity Value stays constant until the deferral period ends (by death, surrender, or annuitization), and the Minimum Guaranteed Surrender Value grows at the minimum guaranteed interest rate until the deferral period ends.

Adding the EEB rider and the LIR makes determination of guaranteed floor benefits more complex. The policy form provides that EEB and LIR premiums will only be deducted from the Annuity Value (and reflected in the Minimum Guaranteed Surrender Value calculation) to the extent that there is sufficient indexed interest to pay for them. In other words, the form provides that rider premiums will never force the Annuity Value below its initial level in the absence of other withdrawals.

Any excess rider premiums are carried forward and deducted to the extent possible when either a) the policy is surrendered or b) additional indexed interest is credited. We refer to this as "rider charge carryforward". This treatment of rider premiums implies that the no-growth scenario may not generate the minimum possible policy values. They may actually be lower in a "low growth" scenario, in which the indexed interest is just sufficient to pay for rider charges each year, or in a "sporadic growth" scenario, where the index stays constant for 10 years and then jumps by 10%. This result occurs because in the no-growth scenario, rider premiums are never deducted from the Minimum Guaranteed Surrender Value. In contrast, in the sporadic growth scenario, there is eventually enough growth in the Annuity Value to allow rider premiums to be deducted, and the corresponding minimum guarantee calculation drives the Minimum Guaranteed Surrender Value lower than it would have been in the no-growth case.

Calculation of market values for benefit options is straightforward in the case where the base policy is stand-alone, but becomes more complex when the EEB rider and the LIR are added. There are two main reasons for this: First, the income for the LIR is based on the highest anniversary Account Value since income commencement. This benefit resembles a "discrete lookback" or "highwater mark" option, for which there are no useful closed-form solutions: a numerical approximation method must be used instead. Secondly, the Rider charge carryforward complicates the determination of the guaranteed floor benefits, as described above. Since the benefit options in CARVM-UMV are by definition any excesses over the guaranteed floor benefits, rider charge carryforward naturally also complicates the determination of the benefit option values.

Monte Carlo simulation often provides the simplest approach to option valuation in the absence of closed-form solutions, and that turns out to be true here. We generate stochastic stock index scenarios from a risk-neutral distribution and use them to drive simulated policy value calculations. Using a Monte Carlo approach makes it relatively simple to incorporate rider charge carryforward into the guaranteed floor benefit calculation. "No growth" and "low growth" scenarios are generated in addition to the stochastic stock index scenarios (we refer to the entire set of scenarios as the "augmented scenarios"), and the guaranteed floor benefits are determined as the minimum benefits over the augmented scenarios.

The benefit option payoffs are then the average of the excesses of the stochastic scenario benefits over the guaranteed floor benefits. These option payoffs, discounted to the valuation date using the risk-neutral interest rate, provide the option market values required by CARVM-UMV. The option market values are accumulated to the option expiry dates at the appropriate valuation interest rates and added to the guaranteed floor benefits to yield the total benefits required for a CARVM valuation.

Assumptions for CARVM-UMV Valuation Examples—Mortality in the examples is assumed to follow the a2000 table. Incidence rates for valuation of the disability benefit are taken from Exhibit 2 of the *Report of the Committee to Recommend New Disability Tables for Valuation* (Transactions of the Society of Actuaries, Vol. XXXVII). Class 2 incidence rates for accident and sickness are used. Note that the policy form first establishes that a claim for Social Security Disability benefits has been approved before surrender charges will be waived. Under reasonable assumptions with respect to approval times (4 months) and reconsideration times (4 months) for Social Security Disability claims, this is equivalent to requiring an elimination period of 90 days. An elimination period of 90 days is used because this is the longest elimination period contained in the table.

Incidence rates for valuation of the nursing home benefit are taken from Table D-3 of the *Long-Term-Care Intercompany Study: 1984-1991 Experience* (Transactions, Society of Actuaries, 1993-94 Reports). In accordance with the policy form provisions, an elimination period of 60 days is assumed. Because the study does not break out data for the 60 day elimination period, incidence rates for elimination periods of 15-30 days are used as a conservative approximation.

Type A and Type C valuation interest rates for the example are calculated using the formula in the Section 4(B) of the Standard Valuation Law and the weighting factors specified, assuming a reference interest rate R of 5.5%. The resulting valuation rates are:

| Guarantee Duration (Years) | Type A Rate | Type C Rate |
|---|---|---|
| ≦5 | 5.25% | 4.50% |
| >5, ≦10 | 5.00% | 4.50% |
| >10, ≦20 | 4.75% | 4.25% |
| >20 | 4.25% | 4.00% |

The actual valuation rates used will depend on the actual value of the reference interest rate R for each year of issue.

Point-to-point equity-indexed crediting was assumed for the examples, with a participation rate of 100%, a floor of 0%, and a cap varying by policy year. The assumed cap was 6.5% in the first policy year, 4% in policy years 2-7, and 2% thereafter.

The assumed guaranteed interest rate for calculation of the Minimum Guaranteed Surrender Value in the examples is 1.85%. The actual guaranteed interest rates for policies will vary according to the actual value of the monthly average five-year Constant Maturity Treasury Rate, as specified supra regarding Policy Values, i.e., Annuity Value, Minimum Guaranteed Surrender Value, and Surrender Value.

The stochastic stock index scenarios were generated using a lognormal distribution (Black-Scholes assumptions) with an assumed risk-free interest rate of 5% continuously compounded and a dividend yield of 2%. The number of stock index scenarios generated was 100,000.

CARVM-UMV Valuation Examples—The surrender charge waiver benefit is contained in the base contract and so this benefit is included in each example. Therefore, the examples cover the base contract with or without the (independently selectable) Return of Premium, Enhanced Earnings Benefit, and Lifetime Income Rider (with three assumed income start dates for the LIR).

This gives us sixteen examples in total for a given free partial withdrawal schedule. Because free partial withdrawals affect both base policy benefits and rider benefits, we show reserve values assuming full utilization of free partial withdrawals and showing no utilization—the higher of the two is the CARVM reserve that would actually be held.

All example calculations assume a seven-year surrender charge scale—calculations for the ten-year surrender charge scale are analogous. Similarly, the examples all assume crediting based on the point-to-point crediting method—calculations for the point-to-average crediting method are analogous.

The calculations all show the derivation of the reserve at issue for a $10,000 policy issued to a male aged 55.

The column headings in the examples shown in lirval1.txt have the following meanings: t—the number of years since the issue date; mindb—the minimum death benefit realized over the augmented scenarios; dbproj—the market value of the death benefit option at the valuation date, projected forward at the valuation interest rate; minfpw—the minimum free partial withdrawal benefit realized over the augmented scenarios; fpwproj—the market value of the free partial withdrawal benefit option at the valuation date, projected forward at the valuation interest rate; minns—the minimum net surrender benefit (cash value less any outstanding rider premiums) realized over the augmented scenarios; nsproj—the market value of the net surrender benefit option at the valuation date, projected forward at the valuation interest rate; mindiss—the minimum disability/nursing home benefit realized over the augmented scenarios; dissproj—the market value of the disability/nursing home benefit option at the valuation date, projected forward at the valuation interest rate; minann—the minimum annuitization benefit realized over the augmented scenarios, assuming annuitization to a ten-year certain period annuity; annproj—the market value of annuitization benefit option at the valuation date, projected forward at the valuation interest rate; tpx—the proportion of initial lives still in force per unit issued; tlqx—the mortality decrement per unit issued; tldx—the disability and nursing home decrement per unit issued; vta—the discount factor for the Type A valuation interest rate for each guarantee duration; pvdb—the present value of death benefits through time t at the Type A valuation rate; pvdiss—the present value of disability/nursing home benefits through time t at the Type A valuation rate; vtc—the discount factor at time t of the Type C valuation interest rate a guarantee duration of one year; pvfpw—the present value of the free partial withdrawal benefit using the Type C valuation interest rate; pv(s,an)—the maximum of i) the present value of the annuitization benefit using the Type A valuation interest rate and ii) the present value of the net surrender benefit using the Type C valuation interest rate; and, sumpv—the sum of the present values of the benefits for each duration. As can be seen from the examples, the reserve at issue reduces to the cash value of the policy (in the absence of the ROP benefit) or to the premium (with ROP).

The minimum annuity payments under the contract are based on the a2000 Individual Annuity Valuation Tables, sex-distinct, with interest at 1.5% per year, which are Basis of Settlement Option Factors. The attained age at annuitization will be adjusted downward by one year for each full five year period that has elapsed since Jan. 1, 2000.

The valuation of annuity payments for policies that have annuitized will use the valuation mortality table applicable for the calendar year of contract issue and the appropriate SPIA valuation interest rate applicable for the calendar year of annuitization.

Method of Operation of the Valuation Program. Type testcases and hit enter. Results of CARVM-UMV reserve calculation appear in APL session.

In a preferred embodiment, the method of the invention is implemented by a specially programmed general purpose computer. The steps of the method are implemented by an arithmetic logic unit of the computer with data stored in short term (RAM) and long term memory. In the apparatus claims the functional language is intended to comprise the arithmetic logic unit of the computer together with memory.

As indicated above, the present invention can be embodied in the form of an apparatus with means for the implementing the method, computer-implemented processes and apparatuses for practicing those processes. The present invention can also be embodied in the form of computer program code embodied in tangible media, such as floppy diskettes, CD-ROMs, DVDs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

Thus it is seen that the objects of the invention are efficiently obtained, although modifications and changes to the invention should be readily obvious to those having ordinary skill in the art, and these modifications are intended to be within the scope of the claims.

What is claimed is:

1. A computer-based method for determining a set of equity-indexed crediting parameters E for a lifetime-income equity-indexed deposit product provided to a set of owners having a set of dates of birth B, a rider charge C, a lifetime income percentage scale L, a set of profitability requirements R, a principal amount P, and an account value A, comprising the steps of:

establishing the values of C, L, R, P, A and E at a time when said deposit product is purchased;

generating a set of yield curve and equity index scenarios consistent with valuation parameters;

setting a trial value $E_i$ for E for said product;

calculating the observed distribution D of profitability using said scenarios;

comparing D with R;

computing a revised trial value $E_{i+1}$ for E for said product; and, storing the revised trial value, where said steps of establishing, generating, setting, calculating, comparing, computing, and storing are performed by at least one general purpose computer specially programmed to perform said steps of establishing, generating, setting, calculating, comparing, and computing.

2. The computer-based method as recited in claim 1, further comprising the step of calculating said lifetime income percentage scale L depending on an elapsed time between a latest date from said set B and a time when income commences.

3. The computer-based method recited in claim 1, further comprising equity-indexed linked increases dependent on the elapsed time between a latest date in said set B and a date of each increase.

4. The computer-based method recited in claim 1, further comprising point-to-point equity index credits specified by said set of equity-indexed crediting parameters E, wherein said credits are calculated using a percentage of an increase in an equity index, credited at the end of each policy year, and said credit is no less than an annual minimum value.

5. The computer-based method recited in claim 1, further comprising point-to-point equity index credits specified by said set of equity-indexed crediting parameters E, wherein said credits are calculated using a percentage of an increase in an equity index, credited at the end of each policy year, and said credit is no less than an annual minimum value, and said credit is no greater than an annual maximum value.

6. The computer-based method recited in claim 1, further comprising point-to-average equity index credits specified by said set of equity-indexed crediting parameters E, wherein said credits are calculated using a percentage of an increase in an equity index from a year-start value to an average of values over a policy year, credited at the end of each policy year, and said credit is no less than an annual minimum value.

7. The computer-based method recited in claim 1, further comprising point-to-average equity index credits specified by said set of equity-indexed crediting parameters E, wherein said credits are calculated using a percentage of an increase in an equity index from a year-start value to an average of values over a policy year, credited at the end of each policy year, and said credit is no less than an annual minimum value, and said credit will be no greater than an annual maximum value.

8. The computer-based method as described in claim 1, further comprising point-to-point equity index credits specified by said set of equity-indexed crediting parameters E, wherein said credits are calculated using a percentage of an increase in an equity index, credited at the end of an index interval equal to an integral number N of policy years, and said credit will be no less than a minimum value calculated during each index interval.

9. The computer-based method as described in claim 1, further comprising point-to-point equity index credits specified by said set of equity-indexed crediting parameters E, wherein said credits are calculated using a percentage of an increase in an equity index, credited at the end of an index interval equal to an integral number N of policy years, and said credit is no less than a minimum value, and said credit will be no greater than a maximum value calculated during each index interval.

10. The computer-based method as described in claim 1, further comprising point-to-average equity index credits specified by said set of equity-indexed crediting parameters E, wherein said credits are calculated using a percentage of an increase in an equity index from a year-start value to an average of values over an index interval equal to an integral number N of policy years, credited at the end of said index interval, and said credit will be no less than a minimum value calculated during each index interval.

11. The computer-based method as described in claim 1, further comprising point-to-average equity index credits specified by said set of equity-indexed crediting parameters E, wherein said credits are calculated using a percentage of increase in an equity index from a starting value to an average of values over an index interval equal to an integral number N of policy years, credited at the end of said index interval, and said credit is no less than a minimum value, and said credit will be no greater than a maximum value calculated during each index interval.

12. The computer-based method recited in claim 1, further comprising point-to-point equity index credits specified by said set of equity-indexed crediting parameters E, wherein said credits are calculated using a weighted sum, and said weighted sum adds a compounded value calculated using a declared rate to a percentage of change in an equity index, said credit is credited at the end of an index interval equal to an integral number N of policy years, and said credit is no less than a minimum value during each index interval.

13. The computer-based method recited in claim 1, further comprising point-to-point equity index credits specified by said set of equity-indexed crediting parameters E, wherein said credits are calculated using a weighted sum, and said weighted sum adds a compounded value calculated using a declared rate to a percentage of change in an equity index, said credit is credited at the end of an index interval equal to an integral number N of policy years, and said credit is no less than a minimum value, and said credit is no greater than a maximum value during each index interval.

14. The computer-based method recited in claim 1, further comprising point-to-average equity index credits specified by said set of equity-indexed crediting parameters E, wherein said credits are calculated using a weighted sum, and said weighted sum adds a compounded value calculated using a declared rate to a percentage of change in an equity index from a starting value to an average of values over an index interval equal to an integral number N of policy years, said credit is credited at the end of said index interval, and said credit is no less than a minimum value during each index interval.

15. The computer-based method recited in claim 1, further comprising point-to-average equity index credits specified by said set of equity-indexed crediting parameters E, wherein each credit is calculated using a weighted sum, and said weighted sum adds a compounded value calculated using a declared rate to a percentage of change in an equity index from a starting value to an average of values over an index interval equal to an integral number N of policy years, said credit is credited at the end of said index interval, and said credit is no less than a minimum value, and said credit is no greater than a maximum value during each index interval.

16. A computer-based method for determining a set of equity-indexed crediting parameters E for a lifetime-income equity-indexed deposit product provided to an owner having a date of birth B, a rider charge C, a lifetime income percentage scale L, a set of profitability requirements R, a principal amount P, and an account value A, comprising the steps of:
    establishing the values of C, L, R, P, A and E at a time when said deposit product is purchased;
    generating a set of yield curve and equity index scenarios consistent with valuation parameters;
    setting a trial value $E_i$ for E for said product;
    calculating the observed distribution D of profitability using said scenarios;
    comparing D with R;
    computing a revised trial value $E_{i+1}$ for E for said product;
    storing the revised trial value; and,
    calculating said lifetime percentage scale L depending on the elapsed time between said date of birth B and a time when income commences where said steps of establishing, generating, setting, calculating, comparing, computing, storing, and calculating are performed by at least one general purpose computer specially programmed to perform said steps of establishing, generating, setting, calculating, comparing, computing, and depending.

17. The computer-based method recited in claim 16, further comprising equity-index linked increases depending on the elapsed time between said date of birth B and a date when each increase occurs.

18. A computer-based apparatus for determining the value of a lifetime equity-indexed deposit product, comprising:
    a graphical user interface for at least one specially programmed computer for:
        providing, a set of equity-indexed crediting parameters E for said lifetime income equity-indexed deposit product to a set of owners having a set of dates of birth B, a rider charge C, a lifetime income percentage scale L, a set of profitability requirements R, a principal amount P, and an account value A, with C, R, L, P, A, and E determined at a time when said deposit product is purchased; and,
        accepting a seller's choice of E; and,
    a processor for the at least one specially programmed computer for computing an observed distribution D of profitability of said deposit product such that D satisfies a set of profitability requirements R.

19. The computer-based apparatus recited in claim 18, wherein the processor is for retrieving said lifetime income percentage scale L depending on the elapsed time between a latest date in said set B and a time when income commences.

20. The computer-based apparatus recited in claim 19, wherein the processor is for calculating equity-index linked increases depending on the elapsed time between a latest date in said set B and a date of each increase.

21. The computer-based apparatus recited in claim 18, wherein the lifetime equity-indexed deposit product includes point-to-point equity index credits specified by said set of equity-indexed crediting parameters E and wherein the processor is for calculating said credits using a percentage of an increase in an equity index and crediting said credits at the end of each policy year, and said credit will be no less than an annual minimum value.

22. The computer-based apparatus recited in claim 18, wherein the lifetime equity-indexed deposit product includes point-to-point equity index credits specified by said set of equity-indexed crediting parameters E and wherein the processor is for calculating said credits using a percentage of an increase in an equity index and crediting said credits at the end of each policy year, and said credit is no less than an annual minimum value, and said credit will be no greater than an annual maximum value.

23. The computer-based apparatus recited in claim 18, wherein the lifetime equity-indexed deposit product includes point-to-average equity index credits specified by said set of equity-indexed crediting parameters E and wherein the processor is for calculating said credits using a percentage of an increase in an equity index from a year-start value to an average of values over a policy year and crediting said credits at the end of each policy year, and said credit will be no less than an annual minimum value.

24. The computer-based apparatus recited in claim 18, wherein the lifetime equity-indexed deposit product includes point-to-average equity index credits specified by said set of equity-indexed crediting parameters E and wherein the processor is for calculating said credits using a percentage of an increase in an equity index from a year-start value to an average of values over a policy year and crediting said credits at the end of each policy year, and said credit is no less than an annual minimum value, and said credit will be no greater than an annual maximum value.

25. The computer-based apparatus recited in claim 18, wherein the lifetime equity-indexed deposit product includes point-to-point equity index credits specified by said set of equity-indexed crediting parameters E and wherein the processor is for calculating said credits using a percentage of an increase in an equity index and crediting said credits at the end of an index interval equal to an integral number N of policy years, and said credit will be no less than a minimum value calculated during each index interval.

26. The computer-based apparatus recited in claim 18, wherein the lifetime equity-indexed deposit product includes point-to-point equity index credits specified by said set of equity-indexed crediting parameters E and wherein the processor is for calculating said credits using a percentage of an increase in an equity index and crediting said credits at the end of an index interval equal to an integral number N of policy years, and said credit is no less than a minimum value, and said credit will be no greater than a maximum value calculated during each index interval.

27. The computer-based apparatus recited in claim 18, wherein the lifetime equity-indexed deposit product includes point-to-average equity index credits specified by said set of equity-indexed crediting parameters E and wherein the processor is for calculating said credits using a percentage of an increase in an equity index from a starting value to an average of values over an index interval equal to an integral number N of policy years and crediting said credits at the end of said index interval, and said credit will be no less than a minimum value calculated during each index interval.

28. The computer-based apparatus recited in claim 18, wherein the lifetime equity-indexed deposit product includes point-to-average equity index credits specified by said set of equity-indexed crediting parameters E and wherein the processor is for calculating said credits using a percentage of an increase in an equity index from a starting value to an average of values over an index interval equal to an integral number N of policy years and crediting said credits credited at the end of said index interval, and said credit is no less than a minimum value, and said credit will be no greater than a maximum value calculated during each index interval.

29. The computer-based apparatus recited in claim 18, wherein the lifetime equity-indexed deposit product includes point-to-point equity index credits specified by said set of equity-indexed crediting parameters E, wherein the processor and is for crediting said credits using a weighted sum, and said weighted sum adds a compounded value calculated using a declared rate to a percentage of change in an equity index, and wherein the processor is for crediting said credit at the end of an index interval equal to an integral number N of policy years, and said credit is no less than a minimum value during each index interval.

30. The computer-based apparatus recited in claim 18, wherein the lifetime equity-indexed deposit product includes point-to-point equity index credits specified by said set of equity-indexed crediting parameters E, wherein the processor is for calculating said credits using a weighted sum, and said weighted sum adds a compounded value calculated using a declared rate to a percentage of change in an equity index, and wherein the processor is for crediting said credit at the end of an index interval equal to an integral number N of policy years, and said credit is no less than a minimum value, and said credit is no greater than a maximum value during each index interval.

31. The computer-based apparatus recited in claim 18, wherein the lifetime equity-indexed deposit product includes point-to-average equity index credits specified by said set of equity-indexed crediting parameters E, wherein the processor is for calculating said credits using a weighted sum, and said weighted sum adds a compounded value calculated using a declared rate to a percentage of change in an equity index from a starting value to an average of values over an index interval equal to an integral number N of policy years, and wherein the processor is for crediting said credit at the end of said index interval, and said credit is no less than a minimum value during each index interval.

32. The computer-based apparatus recited in claim 18, wherein the lifetime equity-indexed deposit product includes point-to-average equity index credits specified by said set of equity-indexed crediting parameters E, wherein the processor is for calculating said credits using a weighted sum, and said weighted sum adds a compounded value calculated using a declared rate to a percentage of change in an equity index from a starting value to an average of values over an index interval equal to an integral number N of policy years, and wherein the processor is for crediting said credit at the end of said index interval, and said credit is no less than a minimum value, and said credit is no greater than a maximum value during each index interval.

33. A computer-based apparatus for determining the value of a lifetime equity-indexed deposit product, comprising:
  a graphical user interface for at least one specially programmed computer for:
    providing, a set of equity-indexed crediting parameters E for said lifetime income equity-indexed deposit product to an owner having a date of birth B, a rider charge C, a lifetime income percentage scale L, a set of profitability requirements R, a principal amount P, and an account value A, with C, R, L, P, A, and E determined at a time when said deposit product is purchased; and,
    accepting a sellers choice of E; and,
  a processor for the at least one specially programmed computer for computing an observed distribution D of profitability of said product such that D satisfies a set of profitability requirements R, and said lifetime income percentage L depends on the elapsed time between at least one date of birth B and a time when income commences.

34. The computer-based apparatus recited in claim 33, wherein the processor is for calculating equity-index linked increases depending on the elapsed time between date of birth B and a date when each increase occurs.

* * * * *

UNITED STATES PATENT AND TRADEMARK OFFICE
CERTIFICATE OF CORRECTION

PATENT NO. : 7,590,583 B1
APPLICATION NO. : 11/453692
DATED : September 15, 2009
INVENTOR(S) : Derek Ferguson It is certified that error appears in the above-identified patent and that said Letters Patent is hereby corrected as shown below:

Column 19, lines 45-67, claim 1, should read:

1. A computer-based method for determining a set of equity-indexed crediting parameters E for a lifetime-income equity-indexed deposit product provided to a set of owners having a set of dates of birth B, a rider charge C, a lifetime income percentage scale L, a set of profitability requirements R, a principal amount P, and an account value A, comprising the steps of:
establishing the values of C, L, R, P, A and E at a time when said deposit product is purchased;
generating a set of yield curve and equity index scenarios consistent with valuation parameters;
setting a trial value $E_i$ for E for said product;
calculating the observed distribution D of profitability using said scenarios;
comparing D with R;
computing a revised trial value $E_{i+1}$ for E for said product; and,
storing the revised trial value, where said steps of establishing, generating, setting, calculating, comparing, computing, and storing are performed by at least one general purpose computer specially programmed to perform said steps of establishing, generating, setting, calculating, comparing, computing, and storing.

Column 21, line 48 through Column 22 line 4, Claim 16 should read:

16. A computer-based method for determining a set of equity-indexed crediting parameters E for a lifetime-income equity-indexed deposit product provided to an owner having a date of birth B, a rider charge C, a lifetime income percentage scale L, a set of profitability requirements R, a principal amount P, and an account value A, comprising the steps of:
establishing the values of C, L, R, P, A and E at a time when said deposit product is purchased;
generating a set of yield curve and equity index scenarios consistent with valuation parameters;
setting a trial value $E_i$ for E for said product;
calculating the observed distribution D of profitability using said scenarios;
comparing D with R;
computing a revised trial value $E_{i+1}$ for E for said product;
storing the revised trial value; and,
calculating said lifetime percentage scale L depending on the elapsed time between said date of birth B and a time when income commences where said steps of establishing, generating, setting, calculating, comparing, computing, storing, and calculating are performed by at least one general purpose computer

CERTIFICATE OF CORRECTION (continued)
U.S. Pat. No. 7,590,583 B1 specially programmed to perform said steps of establishing, generating, setting, calculating, comparing, computing, storing, and calculating.

Signed and Sealed this

Sixth Day of April, 2010

David J. Kappos
*Director of the United States Patent and Trademark Office*